April 23, 1929. D. V. FALLON 1,709,973
AMMETER
Filed Oct. 13, 1927

Inventor
David V. Fallon.

By Charles E. Vining
Attorney

Patented Apr. 23, 1929.

1,709,973

UNITED STATES PATENT OFFICE.

DAVID V. FALLON, OF DETROIT, MICHIGAN, ASSIGNOR TO DONGAN ELECTRIC MANUFACTURING CO., OF DETROIT, MICHIGAN, A CORPORATION OF MICHIGAN.

AMMETER.

Application filed October 13, 1927. Serial No. 225,868.

This invention relates to ammeters for indicating the direction of flow of current in a circuit, and the object is to provde an ammeter of very simple construction and provide in conjunction therewith a permanent magnet and means for varying the extent and power of the magnet field to hold the pointer of the ammeter at zero indication when there is no flow of current in the circuit. The principal features of the invention are involved in the arrangement of the parts to provide a portion only of the circuit adjacent an armature with which the pointer is provided, the armature of which lies between a part through which the current flows and the permanent magnet and further in the construction and means employed to vary the magnetic field of the permanent magnet. These objects and the several novel features of the invention are hereinafter more fully described and claimed, and the preferred form of construction of an ammeter embodying my invention is shown in the accompanying drawing in which—

The construction of the ammeter heretofore has been somewhat complicated being provided with coils through which the current is passed to influence the pointer member. In my improved device the coils are dispensed with and current flow may be through the face plate of the armature or an additional band or strip of metal adjacent the same as is hereinafter described.

Figure 3:
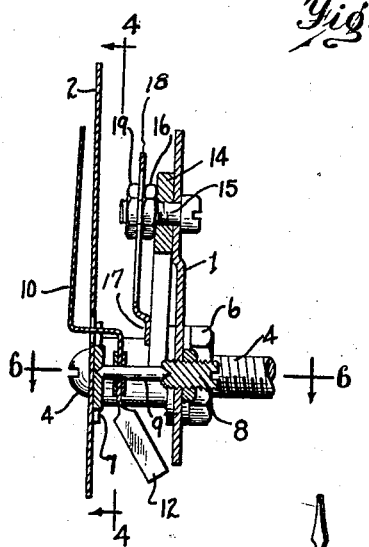
Fig. 3 is a section taken on line 3—3 of Fig. 1.
Figure 4:
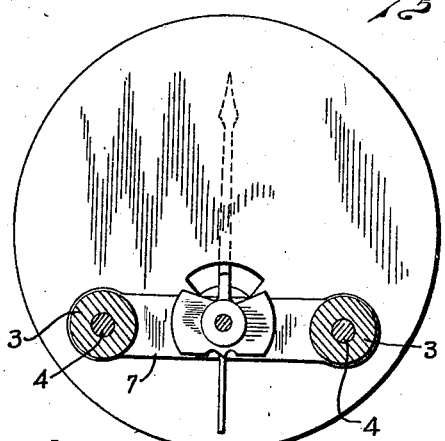
Fig. 4 is a view of the face plate from the rear taken on the section line 4—4 of Fig. 3.
Figure 5:
Fig. 5 is a detail in perspective of the pointer member.
Figure 6:
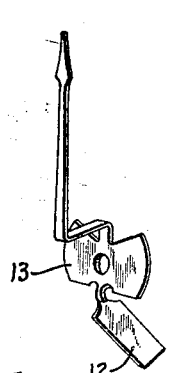
Fig. 6 is a detail in section practically on line 6—6 of Fig. 3.
Figure 6:
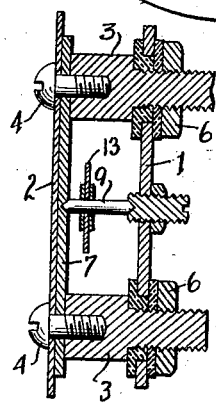

In the preferred construction, the ammeter consists of a base plate 1 and a face plate 2 supported on the base by spacer blocks 3—3 and screws 4—4 passing therethrough and extending to the rear of the base as shown particularly in Figs. 3 and 6 from which it will be seen that each screw and the spacer blocks 3 are insulated from the base plate 1 and are in electrical contact with the face plate 2. Binding nuts 6 are provided on the screws to hold the same in place and to provide means for attaching terminals of the circuit thereto so that the two screws and the face plate 2 form part of the circuit. An additional copper strip 7 may be secured on the inner side of the face plate between the two screws. Centrally of the base plate 1 and extending through a threaded aperture therein is a plug 8 having a coned socket at the forward end for the pointer shaft 9 and the member 7 may also have a similar socket for the opposite end of the pointer shaft. The pointer 10 is secured to this shaft between the plates 1 and 2 and extends outward through an aperture 11 in the face plate and thence upward to the graduation marks relative to which the end of the pointer is movable in either direction. This pointer is provided with a depending portion 12 providing a counter-balance for the pointer and, as will be readily understood from Fig. 5, this entire pointer member may be formed of blank sheet metal and provided with the wing like portions 13 forming an armature which normally lies practically parallel with the member 7 and between the two screws 4—4.

Figure 2:
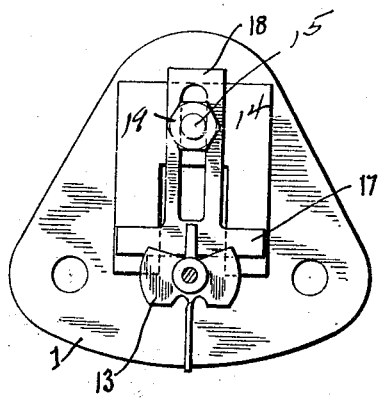
Fig. 2 is a view with the face plate removed, the pointer being broken away to show the adjustable armature for the permanent magnet.

There is also provided on the inner side of the base 1 a permanent magnet 14 of the usual horseshoe type and this is supported with the two poles of the magnet each side of the pointer shaft 9 as will be understood from Fig. 2. It will be seen in the said figure, that the pointer armature 13 lies directly on a line between the two screw members 4 and between the two poles of the magnet and just forward of the two poles of the magnet. The permanent magnet is supported in place by a screw 15 extending through the plate 1 and provided with a nut 16 to bind the same in place. An armature 17 is provided for the permanent magnet which consists of thin sheet metal provided with a slotted extension 18 fitting over the screw 15 at the upper end and is held in place on the screw by a nut 19. By loosening the nut, this armature may be moved relative to the pole pieces to increase or decrease the power of the magnetic field and can be turned readily to one side or the other of a line passing from the screw 15 to the armature shaft 9 so that one or the other of the pole pieces is of stronger magnetic influence. By moving the armature 17 forward or backward, calibration on the charge or discharge side is advanced or retarded to an equal degree. By moving the armature diagonally to the magnet, calibration on the charge and discharge side will be advanced to an unequal degree. The armature also acts as a keeper for the magnet.

Figure 1:
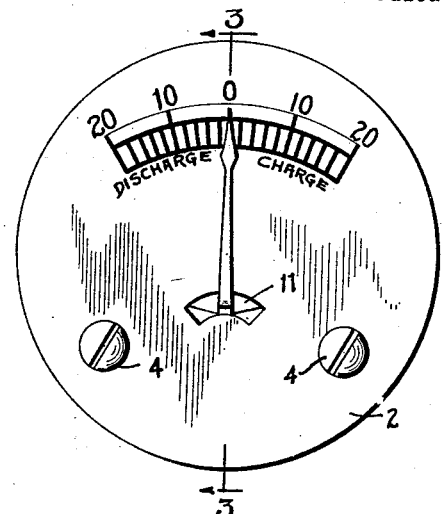
Fig. 1 is a view of the ammeter showing the pointer and the graduated scale relative to which the pointer is movable.

This arrangement enables the structure to be made without any great accuracy as to balancing of the various parts of the needle for instance as any discrepancy in that respect may be compensated for by the magnet armature. Further, the counterbalancing member 12 may be bent slightly one way or the other to cause the needle to stand at zero by influence of gravity. The ammeter is designed to be used with the pointer member extending vertically as shown in Fig. 1.

It is therefore evident that, by the simplicity of the parts and the arrangement thereof, the device is extremely inexpensive in construction and very little labor is involved in assembling the various parts and any extreme accuracy in manufacture is obviated, adapting the same for production on a large scale.

It is further evident that the structure may be embodied in a casing or otherwise mounted for use without departing from the spirit of this invention. A particular feature of the invention is in dispensing with the usual coil of the circuit wire about the pointer armature and making the plate, or bar in conjunction with the plate, part of the circuit. With the armature and such coil as previously used, considerable exactness in manufacture and considerable care in installing the same in proper relation with the pointer armature was required. By the arrangement and construction herein described, the parts are automatically brought to the necessary position by the mere act of inserting the screws to assemble the parts. I prefer to use a small phosphor bronze bar 7 between the two screws 4 but this may be readily dispensed with as the plate 2 itself may provide the path for current between the screws 4—4. The pointer armature 13 lies quite close to the plate 2 and bar 7 as here shown, and the magnetic field set up by the flow of current in one direction or the other across the plate and bar 7 tends to turn the pointer armature at a right angle to the direction of flow of the current moving the pointer member in one direction on its axis on flow of current one way and in the other direction the other way. Thus, if the armature be used on a battery line, as in the usual automobile, the direction and extent of the charge or discharge of the battery will be indicated by the pointer.

Having thus briefly described my invention, what I claim is—

1. In an ammeter, a base plate and a face plate in spaced relation, screws extending from the face plate and through the base plate in electric contact with the face plate and insulated from the base plate providing terminals for an electric circuit, the face plate providing a path for electric current from one terminal to the other, a pointer member provided with an armature pivotally supported between the plates and having a pointer end extending over the face plate, the face plate having an aperture for the pointer, and a permanent magnet on the base plate having pole pieces adjacent the pointer armature.

2. In an ammeter, a base plate and a face plate in spaced relation, a pair of screws extending through the face plate and the base plate, spacers on the said screws between the plates, the screws holding the plates in assembled relation and the screws providing terminals for an electric circuit, the face plate providing a path for electric current from one terminal to the other, a pointer member pivotally supported between the plates and having an enlarged portion providing an armature adjacent the face plate and normally on a line extending between the said screws, a permanent magnet on the base plate having polar portions adjacent the pointer armature magnetically holding the armature of the pointer, the face plate having an aperture through which the pointer extends and being further provided with graduations relative to which the pointer is movable.

3. In an ammeter, a pair of plates of non-magnetic metal, means for securing the same together in spaced relation, said means being in insulated relation with the base plate and providing electrical terminals in electrical contact with the face plate, the face plate providing a path for electric current from one terminal to the other, a pointer member pivotally supported between the plates and having an armature, a permanent magnet on the base plate having polar portions adjacent the pointer armature holding the same in neutral position with its longitudinal axis parallel to the line passing between the two screws, said face plate having an aperture through which the pointer member extends, there being graduations thereon for the said pointer, and means for varying the magnetic field distribution of the permanent magnet.

4. In an ammeter, a base plate and a face plate, screws extending through the plates adapted to hold the same in spaced relation and being in electrical contact with the face plate and insulated from the base plate, said screws providing terminals at the rear of the base plate for an electric circuit, a pointer member provided with an armature pivotally supported between the plates and having a pointer end extending through an aperture provided in the face plate, said face plate having calibrations for the pointer, a permanent magnet between the said plates having pole pieces adjacent the pointer armature, and an armature adjustable thereon diagonally of the center line thereof and toward or from the pointer armature.

In testimony whereof, I sign this specification.

DAVID V. FALLON.